(12) United States Patent
Theinert et al.

(10) Patent No.: US 9,044,906 B2
(45) Date of Patent: Jun. 2, 2015

(54) METHOD AND FORMING TOOL FOR PRODUCING A FIBER COMPOSITE PREFORM

(71) Applicant: Bayerische Motoren Werke Aktiengesellschaft, Munich (DE)

(72) Inventors: Joerg Theinert, Ohu (DE); Horst Mai, Furth (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 68 days.

(21) Appl. No.: 13/709,927

(22) Filed: Dec. 10, 2012

(65) Prior Publication Data
US 2013/0101694 A1   Apr. 25, 2013

Related U.S. Application Data

(63) Continuation of application No. PCT/EP2011/002347, filed on May 12, 2011.

(30) Foreign Application Priority Data

Jun. 14, 2010   (DE) .......................... 10 2010 030 009

(51) Int. Cl.
*B29C 70/56*    (2006.01)
*B29C 70/54*    (2006.01)
(Continued)

(52) U.S. Cl.
CPC ................. *B29C 70/56* (2013.01); *B29B 11/16* (2013.01); *B29C 51/082* (2013.01); *B29C 51/30* (2013.01); *B29C 70/541* (2013.01)

(58) Field of Classification Search
CPC ........ B29C 70/541; B29C 70/56; B29C 51/30
USPC .................................. 425/395, 397
See application file for complete search history.

(56) References Cited

U.S. PATENT DOCUMENTS 4,127,378 A * 11/1978 Meadors .................. 425/398
6,524,510 B2 * 2/2003 Spengler .................. 264/248
(Continued)

FOREIGN PATENT DOCUMENTS

CN     101641205 A     2/2010
DE     199 22 799 A1   11/2000
(Continued)

OTHER PUBLICATIONS

English translation of Chinese Search Report dated May 6, 2014 (One (1) page).
(Continued)

*Primary Examiner* — Alison Hindenlang
(74) *Attorney, Agent, or Firm* — Crowell & Moring LLP

(57) ABSTRACT

A method and forming tool produce a multi-dimensionally profiled preform from a multidirectional fiber composite material. A tensioning frame envelops top and bottom tool components and fixes the fiber composite material so it is allowed to be subsequently fed-in under frictional engagement. In order to compensate for excess material in regions where a shaping gap has a weaker profile, the tool components have forming elements arranged in the edge trimming zone of the preform and defining between them a drawing-through gap for the material. The drawing-through gap becomes increasingly the shape of a bead in synchronism with the tool components closing movement, and/or the tensioning surface of the tensioning frame is vertically adjusted relative to a tool component inlet surface in the forming phase such that a drawing edge for the material is formed in the tensioning surface.

7 Claims, 3 Drawing Sheets

(51) Int. Cl.
  B29B 11/16  (2006.01)
  B29C 51/08  (2006.01)
  B29C 51/30  (2006.01)

(56) References Cited

U.S. PATENT DOCUMENTS

| | | | |
|---|---|---|---|
| 7,128,869 B2 | 10/2006 | Habisreitinger et al. | |
| 8,066,922 B2 | 11/2011 | Jansen et al. | |
| 2007/0035064 A1* | 2/2007 | Coffield | 264/257 |
| 2010/0263789 A1 | 10/2010 | Graeber | |

FOREIGN PATENT DOCUMENTS

| | | |
|---|---|---|
| DE | 100 35 237 C1 | 9/2001 |
| DE | 101 53 035 A1 | 5/2003 |
| DE | 10 2007 058 727 A1 | 6/2009 |
| EP | 0 186 015 A2 | 7/1986 |
| EP | 1 097 794 A1 | 5/2001 |
| EP | 1 752 274 A1 | 2/2007 |
| FR | 2 669 572 A1 | 5/1992 |
| JP | 4-369512 A | 12/1992 |

OTHER PUBLICATIONS

English translation of Chinese Office Action dated May 6, 2014 (Four (4) pages).
German Search Report dated Oct. 14, 2010 with partial English translation (nine (9) pages).
International Search Report dated Sep. 29, 2011 with English translation (four (4) pages).
English translation of Chinese Office Action dated Nov. 27, 2014 (7 pages).

* cited by examiner

METHOD AND FORMING TOOL FOR PRODUCING A FIBER COMPOSITE PREFORM

CROSS REFERENCE TO RELATED APPLICATIONS

This application is a continuation of PCT International Application No. PCT/EP2011/002347, filed May 12, 2011, which claims priority under 35 U.S.C. §119 from German Patent Application No. 10 2010 030 009.8, filed Jun. 14, 2010, the entire disclosures of which are herein expressly incorporated by reference.

BACKGROUND AND SUMMARY OF THE INVENTION

The invention relates to a method for producing a multi-dimensionally profiled preform from a pre-impregnated or binder-crosslinked, multidirectional fiber composite material. In such a method, a top tool component and a bottom tool component are used. In the closed position these two tool components define between them a shaping gap, which is profiled in conformity with the preform, wherein in the course of closing the tool components, the fiber composite material is re-tightened by way of a tensioning frame, which envelops the tool components, while simultaneously retaining the tensioning force.

During the production of multidimensional preforms that are made of a fiber composite material that is flexible, yet also stable to tension in the fiber direction, the situation may arise that during the forming process in the forming tool the material deforms between the zones of higher deformation rather than in the zones of less deformation. In this case the material deformation can no longer be compensated for by stretching the material and, as result, becomes apparent in the formation of folds or any other kind of defect in the preform.

In contrast, the object of the present invention is to design a method and a forming tool of the type described at the outset in such a way that the resulting preforms show a significant improvement in quality during production.

The invention achieves this and other objects by a method, and a forming tool used therein, for producing a multi-dimensionally profiled preform from a pre-impregnated or binder-crosslinked, multidirectional fiber composite material by way of a top tool component and a bottom tool component. In the closed position these two tool components define between them a shaping gap, which is profiled in conformity with the preform, wherein in the course of closing the tool components, the fiber composite material is re-tightened by way of a tensioning frame, which envelops the tool components, while simultaneously retaining the tensioning force. In order to compensate for the excess material in regions where the shaping gap has a weaker profile, the fiber composite material is increasingly deformed in the form of a bead in the edge trimming zone of the preform between the shaping gap and the tensioning frame in synchronism with the closing movement of the tool components at the start of the material forming process.

Alternatively or additionally, the forming tool includes a tensioning frame, which envelops the tool components. In the course of closing the tool components, the tensioning frame fixes the fiber composite material in such a way that allows the fiber composite material to be subsequently fed in such that it is frictionally engaged. The tensioning surface of the tensioning frame is vertically adjusted relative to an inlet surface of one of the tool components in such a way that a drawing edge, which is effective in the forming phase and which is provided for the fiber composite material, which subsequently flows into the shaping gap, is formed on the tensioning surface.

According to a first embodiment of the invention, the differences in the profile length of the shaping gap during the forming phase of the fiber composite material is largely compensated for by the fact that in the region of the subsequent edge trimming process of the preform between the tensioning frame and the shaping gap, the fiber composite material is gathered increasingly in the form of a bead at the points where the profile length is less, with the result that the tensile stress of the fiber composite material in the shaping gap and the material after-draft along the tensioning frame become highly uniform during the forming process. And, even in the event that the geometry of the shaped part is complex, it is possible to achieve a significant improvement in the molding on of the material at the shaping gap contour without the disturbing material defects and, in particular, the fold formations by a method that is easy to carry out in the manufacturing process.

Preferably, the drawing-through length and, thus, the material consumption, in the drawing-through gap, is not constant, but rather changes transversely to the draft direction, as a function of the local differences in the profile lengths. This arrangement allows once again the adaptation of the material to the geometry of the shaping gap to be significantly improved even more.

In order to ensure in a simple way that the material consumption in the drawing-through gap is covered by the excess material on the part of the shaping gap of the tool components and not by the fiber composite material that is re-tightened by use of the tensioning frame, the fiber composite material in the drawing-through gap is loaded with a non-uniform retaining force that is higher in the inlet region on the side of the tensioning frame than in the outlet region.

According to an additional embodiment of the invention, the fiber composite material is drawn over a tool edge, which is arranged on the inlet side of the shaping gap, during the forming phase. This arrangement prevents the formation of disturbing defects in the material and, above all, the formation of folds, which develop in the course of the afterflow of the fiber composite material due to the differences in the local profile lengths and the resulting differences in the tensile stress, induced by said difference in the local profile lengths, at the tensioning frame, from propagating in the shaping gap. As a result, the smoothing effect that is achieved with such an arrangement allows even such preforms that exhibit a very complex contour to be produced with a fiber structure of the highest quality once again in a way that is easy to carry out during the production process.

In an especially preferred embodiment of the invention, the temperature of the tensioning frame is set by heating or cooling to the gelation level of the fiber composite material, so that this material is held at the tensioning frame with practically zero cohesive friction. As a result, it is possible to prevent in an effective way a jerky afterflow of the fiber composite material, said jerky afterflow being induced by the sudden state changes between the cohesive friction at the tensioning frame, on the one hand, and the sliding friction, on the other hand.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
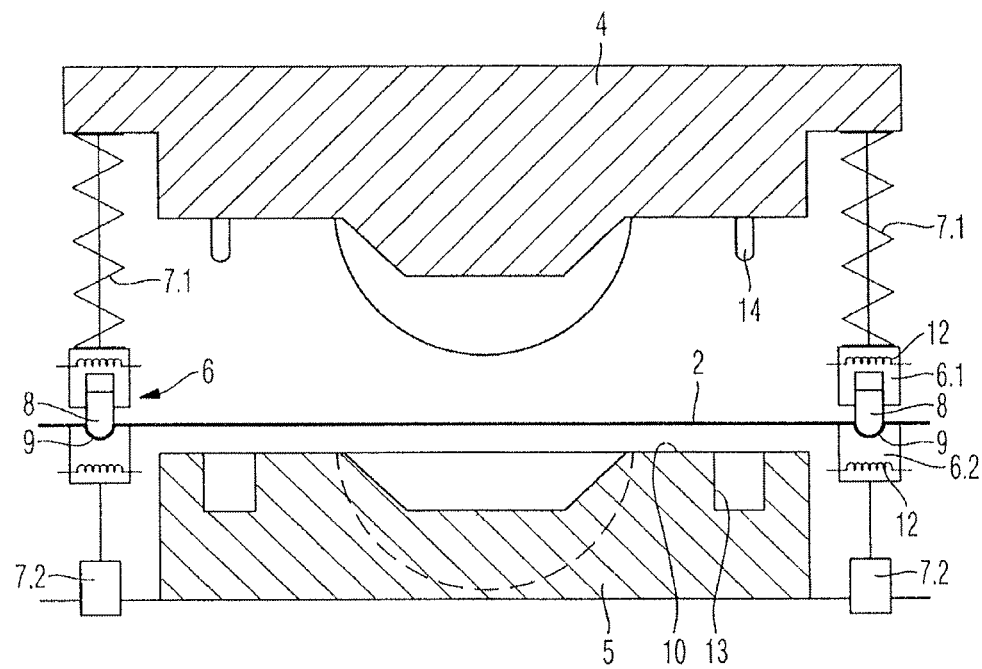
FIGS. 1a and 1b are, in each case, a partially cut view of a forming tool, according to an embodiment of the invention for producing a fiber composite preform, in the open position (a) and in the end phase of the forming process (b)
Figure 4:
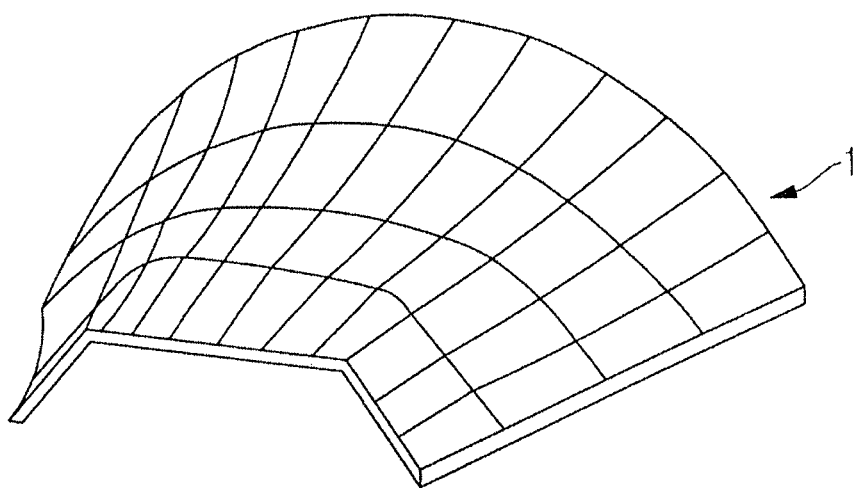
FIG. 4 is a perspective view of a fiber composite preform that has a profile that cannot be developed; and this fiber composite preform is produced according to the invention.

The forming tool, which is shown in the figures, is used to produce a preform that has a three dimensional profile that cannot be developed, for example a transition piece 1, which is shown in FIG. 4, but also an entire bottom structure of a motor vehicle, from a pre-impregnated or binder-crosslinked fiber mat 2, which is constructed in a multi-directional way from a plurality of fiber layers that are stacked one above the other. This forming tool includes, as the main components, a top tool component 4 and a bottom tool component 5. In the closed position, these two tool components 4, 5 define a shaping gap 3, which corresponds to the three dimensional shape of the preform 1 to be produced. This forming tool also includes a tensioning frame 6, which envelops the tool components 4, 5. In the open position of the tool components 4, 5, the fiber mat 2, which is initially still flat (see FIG. 1a), is securely clamped to the tensioning frame 6 in such a way that the fiber mat 2 is tightened up with a defined tensile stress in the shaping gap 3 during the closing stroke of the tool.

The tensioning frame 6 is designed as two parts composed of a top frame part 6.1 and a bottom frame part 6.2. These two parts 6.1, 6.2 are pressed against each other via a helical spring or a gas compression spring 7.1, 7.2, in such a way that the two parts are springy. A clamping strip 8, which extends in the longitudinal direction of the frame, is placed in the top frame part 6.1. This clamping strip 8 interacts with a corresponding hollow channel 9 in the bottom frame part 6.2 and is subdivided into individual clamping strip segments. Each of the individual clamping strip segments is fastened to the frame part 6.1 in such a way that the individual clamping strip segments can be vertically adjusted, so that the clamping tension and, consequently, the retaining force, exerted on the fiber mat 2, can be adjusted at the tensioning frame 6 such that both the clamping tension and the retaining force differ locally.

During the closing stroke of the forming tool, the tensioning frame 6 is lowered jointly with the top tool component 4 until its tensioning surface moves underneath the inlet surface 10 of the bottom tool component 5, so that the fiber material 2, which subsequently flows in from the side of the tensioning frame 6 in the forming phase, is drawn over the outer edge of the bottom tool component 5 that acts then as the drawing edge 11, and is smoothed out on this outer edge just before flowing into the shaping gap 3. Furthermore, heating elements 12 are integrated into the tensioning frame 6. The binder-crosslinked or pre-impregnated fiber material 2 is held at the gelation temperature by way of the heating elements 12, in order to ensure in this way that the fiber material 2 will be re-tightened without any jerky movement.

Figure 2:
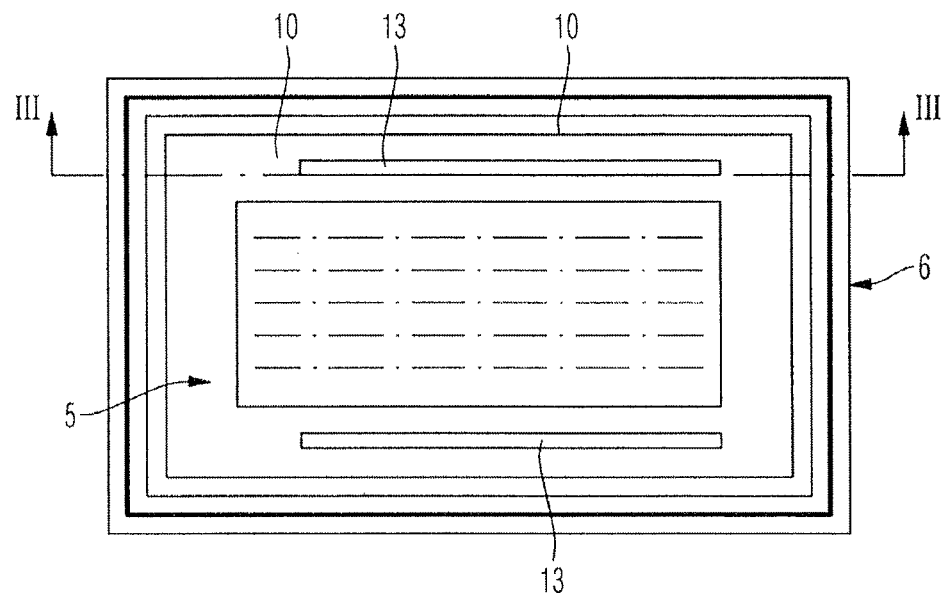
FIG. 2 is a view of the bottom component of the tool, according to FIG. 1, on a smaller scale.
Figure 3:
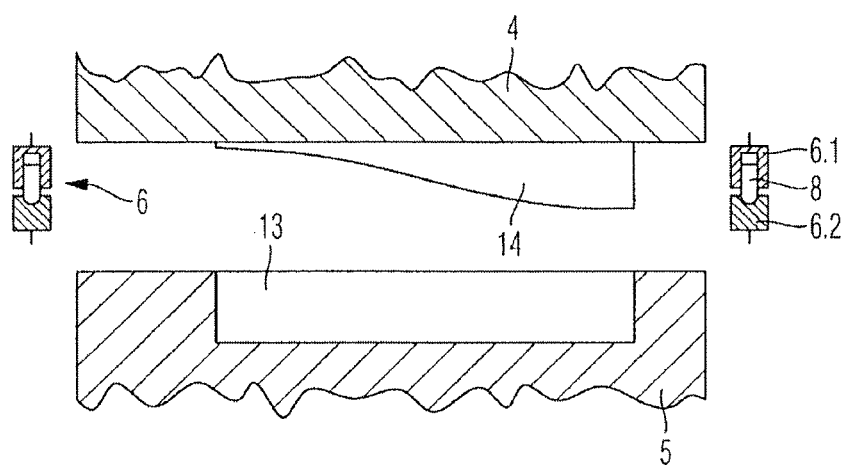
FIG. 3 is a sectional view taken along the line III-III from FIG. 2.

According to an additional aspect of the illustrated forming tool, the material flow into the shaping gap 3 is adapted to the various profile lengths of the preform 1. For this purpose, in the zone of the subsequent edge trimming operation of the preform 1 between the shaping gap 3 and the tensioning frame 6, a groove 13 is arranged in the bottom tool component. A deflecting rib 14, which dips increasingly further into the groove 13 in synchronism with the closing movement of the tool after the start of the material forming operation, is arranged on the top tool component 4. This groove 13 and the deflecting rib 14 form a drawing-through gap 15, which deforms the fiber material 2 in the form of a bead. At the same time in the reverse situation the fiber material 2 is gathered to form a local profile length with the forming process, which can be seen best in FIGS. 2 and 3, where the drawing-through gap 15, which consists of the deflecting rib 14 and the receiving groove 13, is recessed in the zone of the maximal profile length, i.e. in the illustrated exemplary embodiment on the left end of the mold cavity, where the profile length of the preform 1 is the greatest; and the deflecting rib 14 has an immersion depth that changes in the longitudinal direction of the rib, as a function of the local deviations from the maximal profile length.

Figure 1B:
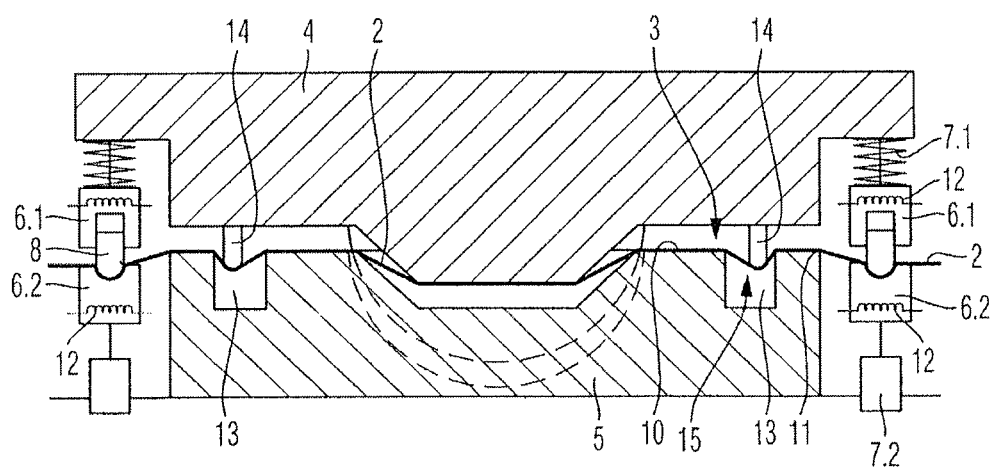

In order to ensure that the material consumption in the drawing-through gap 15 is covered by the excess material on the side of the shaping gap and not by the fiber material, which is re-tightened on the part of the tensioning frame 6, the deflecting rib 14 is moved in such a way that it is arranged in an off-centered manner (FIG. 1b) in the direction of the wall of the groove on the side of the tensioning frame, so that at this point the fiber material 2 becomes jammed more and more and, therefore, as the deformation continues to grow in the form of a bead, the fiber material is drawn more and more from the end at the shaping gap into the drawing-through gap 15.

Fiber composite preforms of almost any arbitrary shape can be produced with the described forming tool and forming method. Then, these fiber composite preforms can be further processed into structural components of high load stability in an additional production step, preferably by way of the resin injection method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a multi-dimensionally profiled preform from a pre-impregnated or binder-crosslinked, multidirectional fiber composite material in a forming tool having a top tool component and a bottom tool component, wherein in a closed position the top and bottom tool components define a shaping gap therebetween, the shaping gap being profiled in conformity with the preform, the method comprising the acts of:

in a course of closing the top and bottom tool components, re-tightening the fiber composite material while simultaneously retaining a tensioning force via a tensioning frame that envelopes the top and bottom tool components;

in order to compensate for excess material in regions where a shaping gap has a weaker profile, increasingly deforming the fiber composite material in the form of a bead, that is formed within a cavity defined by the bottom tool component, in an edge trimming zone of the preform between the shaping gap and the tensioning frame in synchronism with a closing movement of the top and bottom tool components at a start of a material forming process, wherein the top tool component includes a deflecting rib which dips increasingly further into the cavity in synchronism with the closing movement of the tool after the start of the material forming operation.

2. The method according to claim 1, wherein the tensioning frame includes a top frame part and a bottom frame part, the top frame part including a clamping strip which: i) extends in the longitudinal direction of the tensioning frame, and ii) interacts with a corresponding hollow channel in the bottom frame part.

3. A forming tool configured to produce a multi-dimensionally profiled preform from a pre-impregnated or binder-crosslinked, multidirectional fiber composite material, the forming tool comprising:

a top tool component and a bottom tool component;

a shaping gap defined between the top tool component and the bottom tool component in a closed position of the tool components, the shaping gap being profiled in conformity with the preform; and a tensioning frame enveloping the tool components, the tensioning frame fixing the fiber composite material in a course of closing the tool components such that the fiber composite material is allowed to be subsequently fed-in while being frictionally engaged, wherein the top and bottom tool components comprise forming elements arranged in an edge trimming zone of the preform in order to compensate for excess material in regions where the shaping gap has a weaker profile, the forming elements defining between them a drawing-through gap for the fiber composite material, which drawing-through gap is formed within a cavity defined by the bottom tool component and becomes increasingly a shape of a bead in synchronism with a closing movement of the tool components at a start of a material forming process, and the top tool component includes a deflecting rib which dips increasingly further into the cavity in synchronism with the closing movement of the tool after the start of the material forming operation.

4. The forming tool according to claim 3, wherein the drawing-through gap has a drawing-through length that varies as a function of differences in a local profile length.

5. The forming tool according to claim 4, wherein in the drawing-through gap the fiber composite material is loaded with a non-uniform retaining force that is higher in an inlet region of the drawing-through gap on a side of the tensioning frame than in an outlet region on a side of the shaping gap.

6. The forming tool according to claim 3, wherein in the drawing-through gap the fiber composite material is loaded with a non-uniform retaining force that is higher in an inlet region of the drawing-through gap on a side of the tensioning frame than in an outlet region on a side of the shaping gap.

7. The forming tool according to claim 3, wherein the tensioning frame includes a top frame part and a bottom frame part, the top frame part including a clamping strip which: i) extends in the longitudinal direction of the tensioning frame, and ii) interacts with a corresponding hollow channel in the bottom frame part.

* * * * *